(12) United States Patent
Jang et al.

(10) Patent No.: US 10,442,167 B2
(45) Date of Patent: Oct. 15, 2019

(54) BALLISTIC CLOTH USING A UNIDIRECTIONAL-ORIENTED ARAMID SHEET AND POLYETHYLENE FILM AND METHOD FOR MANUFACTURING THE SAME

(71) Applicant: HYOSUNG CORPORATION, Seoul (KR)

(72) Inventors: Se Hun Jang, Seoul (KR); Kee-Hwan See, Seongnam-si (KR)

(73) Assignee: Hyosung Corporation, Seoul (KR)

( * ) Notice: Subject to any disclaimer, the term of this patent is extended or adjusted under 35 U.S.C. 154(b) by 231 days.

(21) Appl. No.: 15/100,424

(22) PCT Filed: Oct. 14, 2014

(86) PCT No.: PCT/KR2014/009603
§ 371 (c)(1),
(2) Date: May 31, 2016

(87) PCT Pub. No.: WO2015/093722
PCT Pub. Date: Jun. 25, 2015

(65) Prior Publication Data
US 2016/0297184 A1    Oct. 13, 2016

(30) Foreign Application Priority Data

Dec. 18, 2013 (KR) .................. 10-2013-0157765
Dec. 18, 2013 (KR) .................. 10-2013-0157766

(51) Int. Cl.
*B32B 27/12* (2006.01)
*F41H 1/02* (2006.01)
(Continued)

(52) U.S. Cl.
CPC .............. *B32B 27/12* (2013.01); *B32B 5/024* (2013.01); *B32B 5/10* (2013.01); *B32B 5/12* (2013.01);
(Continued)

(58) Field of Classification Search
CPC ...................................................... B32B 27/12
See application file for complete search history.

(56) References Cited

U.S. PATENT DOCUMENTS 4,623,574 A * 11/1986 Harpell ..................... B32B 5/28
428/113
4,820,568 A * 4/1989 Harpell ................... B29C 70/12
428/113
(Continued)

FOREIGN PATENT DOCUMENTS

| GB | 1485586 A * | 9/1977 | ............. B29C 70/12 |
|---|---|---|---|
| JP | H08276522 A | 10/1996 | |
| KR | 101021296 B1 | 3/2011 | |

OTHER PUBLICATIONS

Polyethylene, Wikipedia, https://en.wikipedia.org/wiki/Polyethylene, no date.*
(Continued)

*Primary Examiner* — Andrew T Piziali
(74) *Attorney, Agent, or Firm* — Harness, Dickey & Pierce, P.L.C.

(57) ABSTRACT

The present invention relates to a ballistic cloth using a unidirectional aramid sheet and a polyethylene film and a method for manufacturing the same and, more particularly, is characterized in that aramid multifilament layers, which have monofilaments stacked and arranged in one direction, are arranged perpendicularly, a polyethylene film, which plays both the role of a binder and the role of protecting the sheet surface, is arranged between the aramid multifilament layers to manufacture a ply, and the ply is inserted into a (Continued)

mold and undergoes a pressing process and a cooling process, thereby manufacturing a ballistic cloth. A ballistic cloth manufactured by the method according to the present invention is advantageous in that use of a polyethylene film having a low softening point between unidirectional aramid sheets improves adhesiveness between the sheets and also improves the slip factor when the same ply is stacked, thereby exhibiting excellent ballistics performance. In addition, since the binder is solely made of a film, odor-free, environment-friendly manufacturing processes can be employed, no freezing is needed during storage; improved flexibility of the sheet facilitates delivery and distribution of impacts of bullets when the ballistic cloth is worn, thereby improving the ballistics performance and making the ballistic cloth further lightweight; and the polyethylene film, which is the protective layer of the unidirectional aramid sheets, has an adhesive strength of at least 2 kgf, thereby improving the ballistics performance.

3 Claims, 4 Drawing Sheets (51) Int. Cl.
*F41H 5/04* (2006.01)
*B32B 5/02* (2006.01)
*B32B 5/10* (2006.01)
*B32B 5/12* (2006.01)
*B32B 27/32* (2006.01)
*B32B 27/08* (2006.01)
*B32B 37/08* (2006.01)
*B32B 37/14* (2006.01)
*D06M 17/00* (2006.01)

(52) U.S. Cl.
CPC .............. *B32B 27/08* (2013.01); *B32B 27/32* (2013.01); *B32B 37/08* (2013.01); *B32B 37/14* (2013.01); *D06M 17/00* (2013.01); *F41H 1/02* (2013.01); *F41H 5/0485* (2013.01); *B32B 2262/0269* (2013.01); *B32B 2307/558* (2013.01)

(56) References Cited

U.S. PATENT DOCUMENTS

2004/0221712 A1 11/2004 Stewart et al.
2013/0115839 A1 5/2013 Arvidson et al.

OTHER PUBLICATIONS

International Search Report regarding Application No. PCT/KR2014/009603 (with English Translation), dated Jan. 9, 2015.
Written Opinion regarding Application No. PCT/KR2014/009603, dated Jan. 9, 2015.

* cited by examiner

BALLISTIC CLOTH USING A UNIDIRECTIONAL-ORIENTED ARAMID SHEET AND POLYETHYLENE FILM AND METHOD FOR MANUFACTURING THE SAME

CROSS REFERENCE TO RELATED APPLICATIONS

This application is a U.S. National Phase under 35 U.S.C. 371of International Application No. PCT/KR2014/009603, filed Oct. 14, 2014, and published in Korean as WO 2015/093722 A1on Jun. 25, 2015. This application is based on and claims priority to Korean Application Nos. 10-2013-0157765 and 10-2013-0157766, filed Dec. 18, 2013. The entire disclosures of the above applications are incorporated herein by reference.

TECHNICAL FIELD

The present invention relates to a ballistic cloth using a unidirectionally-oriented aramid sheet and a polyethylene film and method of manufacturing the same, more specifically to the ballistic cloth which is manufactured by using a ply which is prepared by arranging an aramid multifilament layer cross-plied at a right angle to a laminated monofilament, and arranging a polyethylene film which acts both as a binder and a sheet surface protector between the aramid multifilament layers. Thereafter, the ply is inserted into a mold and goes through the steps of pressing and cooling.

BACKGROUND ART

The ballistic cloth refers to a kind of clothing which is developed in order to protect the human body against bullet shells and fragments. Therefore, one of the important requisites of the ballistic cloth is the ballistics performance. As the ballistic composite material is a product which needs to protect the body of soldiers etc. from the bullet or the shell, the ballistics performance depends largely on the material used therein.

Since a high tenacity polyethylene (HMPE, High Molecular Weight Polyethylene), which is one kind of such ballistic composite materials, has a low weight of about 0.98 which is even lower than that of water, it is thus widely used as a ballistic material. But the high tenacity polyethylene has the problem that it is susceptible to deformation in case of a physical impact during use, and that it is vulnerable to heat and ruptures easily.

As a part among the other composite materials for the ballistic composite material, the wholly aromatic polyamide fibers, which are collectively called as an aramid fiber, comprises a para-amide fiber having the structure in which benzene rings are connected through an amide group (—CONH) in a straight forward manner, and a meta-amide fiber which is not so. A para-amide fiber has excellent characteristics including high strength, high elasticity, and low shrinkage, etc., and it has such excellent strength that it can lift a vehicle weighing 2 Tons with a thin yarn which has the thickness of about 5, and is thus being widely used as a composite material for the ballistic composite material.

Such ballistic composite material using the aramid fiber, was commonly manufactured by preparing an aramid textile using an aramid fiber, and by dipping a polymer resin into such aramid textile, and solidifying such semi-cured aramid fabric after laminating it into a mold in multiple layers, thereafter.

Conventionally, in the manufacture of a ballistic cloth, an ultra thin polyethylene film (or ultra thin PE film) was used separately as a protection film, and the ultra thin polyethylene film existed on the surface of a unidirectionally-oriented aramid sheet in the form of a protection film.

In manufacturing the conventional unidirectionally-oriented aramid sheet, after dipping it in a resin, it was given a squeezing in order to fit the uniform resin content. Thereafter, it was manufactured by way of either attaching the ultra thin film thereon, or by using a film binder and then coating a viscoelastic object on the surface of the yarn. But this caused a problem that the manufacturing process became troublesome.

Thus, in the relevant industry, in the manufacture of a sheet using a binder that sticks together the layers of an aramid sheet and a polyethylene film which serves as a surface protection film, it is desperately needed that the manufacturing process is made to be simple and time-efficient, and the technology to improve productivity needs to be developed.

DISCLOSURE

Technical Problem

The present invention is devised to solve the problems as described above, and is directed to providing a method of manufacturing a ballistic cloth using a unidirectionally-oriented aramid sheet, which uses a binder that sticks together the layers of the aramid sheet and a polyethylene film which serves as a surface protection film.

Technical Solution

According to the proper example of the present invention, a ballistic cloth using a unidirectionally-oriented aramid sheet and a polyethylene film is constructed of: the 1st array of unidirectionally-oriented aramid fiber bundles; the 1st polyethylene film layer which is laminated to one side of the above-mentioned 1st array of aramid fiber bundles; the 2nd polyethylene film layer which is laminated to the other side of the above-mentioned 1st array of aramid fiber bundles; the 2nd array of aramid fiber bundles which is laminated to one side of the 2nd polyethylene film layer that does not contact with the above-mentioned 1st array of aramid fiber bundles, so that the aligning direction of the multifilament of the above-mentioned 1st array of aramid fiber bundles and the extending direction of the multifilament of the above-mentioned 2nd array of aramid fiber bundles are at a right angle with respect to each other; and the 3rd polyethylene film layer which is laminated to one side of the above-mentioned 2nd array of aramid fiber bundles.

Here, it is preferable that the softening points of the above-mentioned 1st and 3rd polyethylene films are kept between 110 and 125° C. and that the softening point of the above-mentioned 2nd polyethylene film is kept between 100 and 110° C.

Also, it is preferable that each of the adhesive strengths of the 1st and 3rd polyethylene film layers are 2 kgf or greater.

According to the other proper example of the invention, it is preferable that the above-mentioned 1st and 2nd array of aramid fiber bundles are laminated to 7 through 10 layers of monofilament, and that the above-mentioned 1st and 3rd polyethylene film layers are comprised of low density polyethylene films, and that they are laminated to the 2 through 5 layers of a monofilament among the above-mentioned laminated monofilament.

Also, the present invention provides a manufacturing method of a ballistic cloth using a unidirectionally-oriented aramid sheet and a polyethylene film which comprises the steps of: manufacturing of the 1st layer and the 2nd layer in which a polyethylene film is laminated to one side of the unidirectionally-oriented aramid multifilament layer; arranging the above-mentioned 1st polyethylene film layer so that one side of the aramid multifilament to which the 1st polyethylene film layer is not laminated, and one side of the aramid multifilament layer to which the 2nd polyethylene film layer is not laminated, are facing each other, and so that the extending directions of the multifilament of the above-mentioned 1st array of aramid fiber bundles and the 2nd array of aramid fiber bundles are at a right angle with respect to each other; manufacturing of a ply by arranging a polyethylene film between the above-mentioned 1st layer and the 2nd layer; compressing the above-mentioned ply after inserting it into a mold while heating it under pressure; and cooling the above-mentioned ply.

Here, it is preferable that the softening point of a polyethylene film which is laminated to one side of the above-mentioned 1st and 2nd array of aramid fiber bundles is kept between 110 and 125° C., and that the softening point of a polyethylene film which is arranged between the above-mentioned 1st and 2nd layers is kept between 100 and 110° C.

Also, it is preferable that the adhesive strength of a polyethylene film which is laminated to one side of the 1st and 2nd array of aramid fiber bundles is of 2 kgf or greater.

Moreover, it is preferable that the above-mentioned 1st and 2nd array of aramid fiber bundles are laminated to 7 through 10 layers of monofilament, and a polyethylene film which is laminated to one side of the above-mentioned 1st and 2nd array of aramid fiber bundles is comprised of a low density polyethylene film, and is laminated to 2 through 5 layers of a monofilament among the above-mentioned laminated multifilaments.

Also, it is preferable that each of the temperature and the pressure level at which the above-mentioned ply is manufactured by compressing after insertion are kept at 110° C. and 200 kg/cm², respectively.

Furthermore, the present invention also provides a manufacturing method of a ballistic cloth using a unidirectionally-oriented aramid sheet and a polyethylene film which comprises the steps of: manufacturing of the 1st array of aramid fiber bundles composed of a unidirectionally-oriented aramid multifilament; manufacturing of the 1st polyethylene film layer which is laminated to one side of the above-mentioned 1st array of aramid fiber bundles; manufacturing of the 2nd polyethylene film layer which is laminated to the other side of the above-mentioned 1st array of aramid fiber bundles; manufacturing of the double-sided layer (1st Layer) which is manufactured by laminating a polyethylene film layer to both sides of the above-mentioned 1st array of aramid fiber bundles; manufacturing of the 2nd array of aramid fiber bundles which is laminated to one side of the 2nd polyethylene film layer that does not contact with the above-mentioned 1st array of aramid fiber bundles, so that it is at a right angle with respect to the above-mentioned 1st array of aramid fiber bundles; manufacturing of the 3rd polyethylene film layer which is laminated to one side of the 2nd array of aramid fiber bundles that does not contact with the above-mentioned 2nd polyethylene film layer; manufacturing of the single-sided layer (2nd Layer) which is manufactured by laminating a polyethylene film layer to one side of the above-mentioned 2nd array of aramid fiber bundles; manufacturing of a ply by laminating together the above-mentioned double-sided layer (1st Layer) and the single-sided layer (2nd Layer); compressing the above-mentioned ply after inserting it into a mold while heating it under pressure; and cooling the above-mentioned ply.

Here, it is preferable that each of the adhesive strengths of the 1st and 3rd polyethylene film layers are of 2 kgf or greater.

Advantageous Effects

As to the ballistic cloth, which is manufactured by the method of the present invention, demonstrates the advantage of excellent ballistics performance, due to enhanced adhesion between the sheets and due to improved slip factor during the lamination of the same ply.

In addition, since the binder is solely made of a film, odor-free, environment-friendly manufacturing processes can be employed, no freezing is needed during storage; improved flexibility of the sheet facilitates delivery and distribution of impacts of bullets when the ballistic cloth is worn, thereby improving the ballistics performance and making the ballistic cloth further lightweight.

In addition, in the manufacture of a ballistic cloth using a unidirectionally-oriented aramid sheet and a polyethylene film which has a low softening point, the manufacturing process is simplified by using a dry process, and the processing time is shortened, allowing for improved productivity.

Furthermore, it has the advantage that the adhesive strength of a polyethylene film which acts as the protective layer of a unidirectionally-oriented aramid sheet, is of 2 kgf or greater, thereby improving the ballistics performance.

DETAILED DESCRIPTION OF THE PREFERRED EMBODIMENTS

Hereinafter, the present invention is illustrated in more details with reference to the figures and examples. It is to be made clear that the terms used in the examples of the present invention are only used to assist the understanding of the present invention, and the scope of claims of the present invention is not to be interpreted as limited thereto.

The present invention relates to a ballistic cloth consisting of a unidirectionally-oriented aramid sheet and a polyethylene film, which is the binder layer. And, a unidirectionally-oriented aramid sheet is composed of: a polyethylene film; an aramid layer; a polyethylene film; an aramid layer; and a polyethylene film. Manufacturing method thereof will be specifically illustrated hereinafter.

Figure 1:
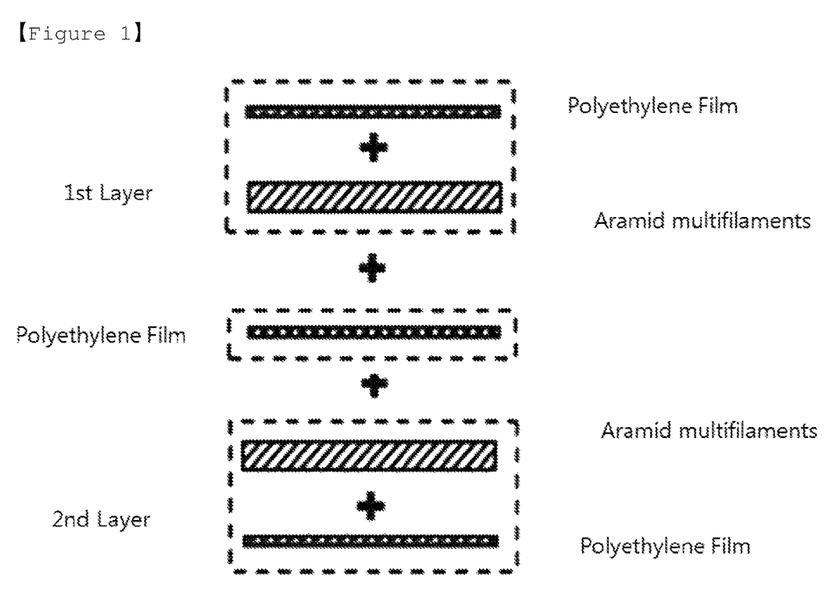
FIG. 1 illustrates a schematic diagram of the manufacturing method of a ply prepared by arranging a polyethylene film between the above-mentioned 1st layer and the 2nd layer, after aligning them at a right angle to each other.

In the first process, the multifilament is composed of hundreds of monofilaments, and a unidirectionally-oriented aramid multifilament is arranged in a form in which the monofilaments of 7 through 10 layers are laminated. And the polyethylene film is laminated to the monofilaments of 2 through 5 layers, among the laminated monofilaments, as a binder. That is, as illustrated in FIG. 1, on one side of a unidirectionally-oriented aramid multifilament and the above-mentioned aramid multifilament, the 1st Layer and the 2nd Layer are formed, which are laminated to a polyethylene film which has the adhesive strength of above 2 kgf. Therefore, taking the film off will also separate the yarn sticking to it, and therefore it is impossible to skin off the protection film only.

Figure 3:
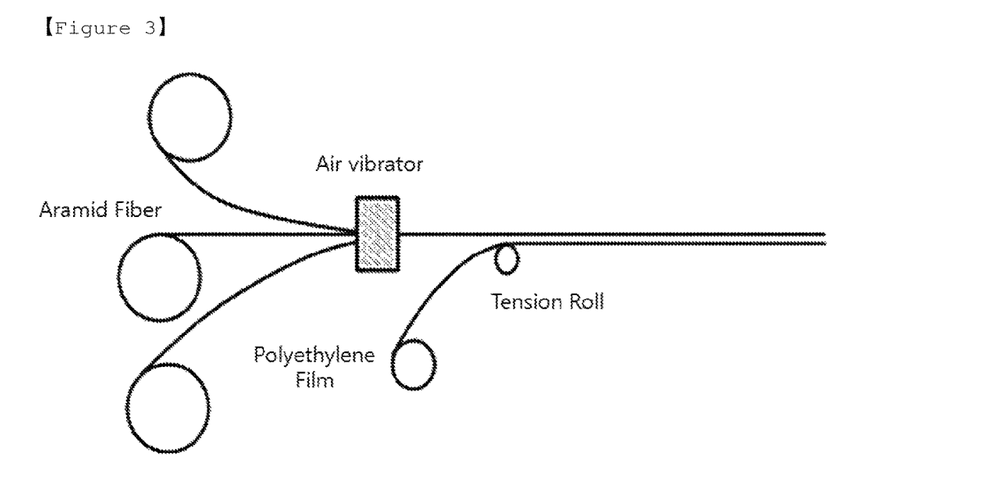
FIG. 3 illustrates a schematic diagram of the manufacturing method of the 1st layer, the 2nd layer, and the single-sided layer.

In the present invention, the weight of a unidirectionally-oriented aramid multifilament layer ranges from 180 to 210 $g/m^2$, and the present invention is characterized by an opening process with the use of an Air vibrator, top and bottom, and right and left, as described in FIG. 3.

In the second process, a ply is prepared by arranging a polyethylene film, which has a lower softening point compared to that of the aramid multifilament layer manufactured in the first process, between the above-mentioned 1st layer and the 2nd layer, after aligning them at a right angle to each other. In the present invention, it is preferable that the width of the film is wider than the total width of an aramid fiber. Also, as concerns the above-mentioned 1st Layer and 2nd Layer, it is preferable that the softening point of a polyethylene film laminated to one side of the above-mentioned aramid multifilament is kept between 110 and 125° C. and the softening point of a polyethylene film arranged between the above-mentioned 1st Layer and 2nd Layer is kept between 100 and 110° C.

Another process of manufacturing a ply of the present invention comprises the steps of: manufacturing of the double-sided layer (1st Layer) which includes the 1st aramid multifilament layer composed of a unidirectionally-oriented aramid multifilament, the 1st polyethylene film layer which is laminated to one side of the above-mentioned 1st array of aramid fiber bundles, and the 2nd polyethylene film layer which is laminated to the other side of the above-mentioned 1st array of aramid fiber bundles; manufacturing of the single-sided layer (2nd Layer) which is composed of the 2nd array of aramid fiber bundles which is laminated to one side of the 2nd polyethylene film layer that does not contact with the above-mentioned 1st array of aramid fiber bundles, so that it is cross-plied at a right angle to the above-mentioned 1st array of aramid fiber bundles, and the 3rd aramid multifilament layer which is laminated to one side of the 2nd array of aramid fiber bundles that does not contact with the above-mentioned 2nd polyethylene film layer; and preparing a ply by laminating together the double-sided layer (1st Layer) and the single-sided layer (2nd Layer). Also, it is preferable that the softening points of the above-mentioned 1st polyethylene film layer and the 3rd polyethylene film layer are each kept between 110 and 125° C. and the softening point of the 2nd polyethylene film layer is kept between 100 and 110° C.

During the manufacture of a ply in the present invention, given that the 1st Layer and the 2nd Layer are the ones where the polyethylene film is on one side of the aramid multifilament fiber, it is preferable to prepare a ply where the 1st Layer and the 2nd Layer are cross-plied at a right angle 0/90° to each other. Also, the angle can be freely controlled according to demand when making a unidirectionally-oriented aramid.

Figure 2:
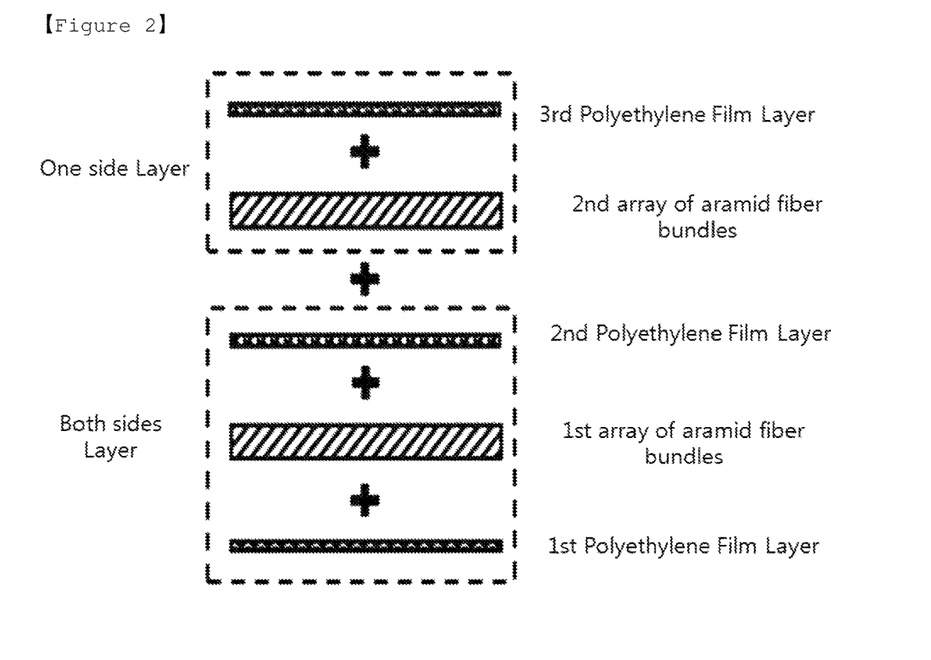
FIG. 2 illustrates a schematic diagram of the manufacturing method of a ply prepared by laminating together the single-sided layer and the double-sided layer.
Figure 4:
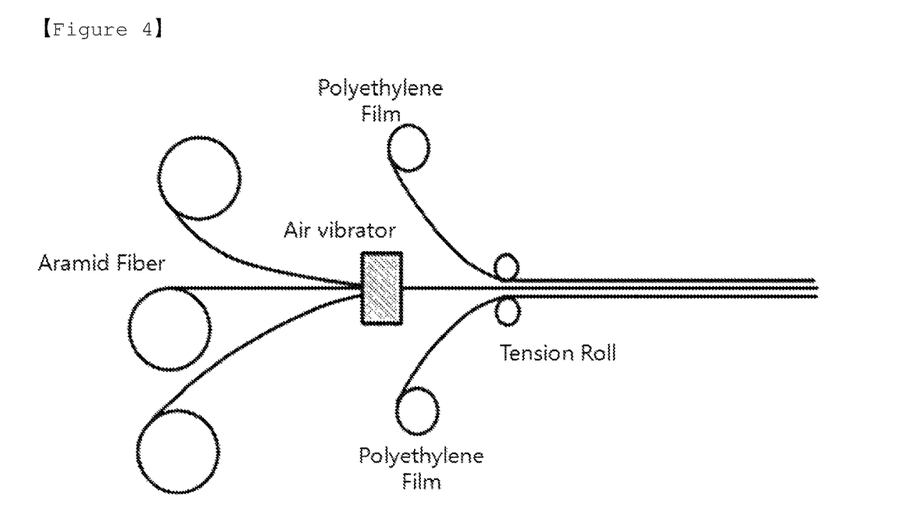
FIG. 4 illustrates a schematic diagram of the manufacturing method of the double-sided layer.

During the manufacture of a ply in the present invention, as described in FIG. 2, given that a polyethylene film is on one side of an aramid multifilament fiber in the single-sided layer (2nd Layer), and that a polyethylene film is on both sides of an aramid multifilament fiber in the double-sided layer (1st Layer), it is preferable to prepare the 1st Layer and the 2nd Layer to be aligned at a right angle 0/90° to each other. Also, the angle can be freely controlled according to demand when making a unidirectionally-oriented aramid. Here, the above-mentioned single-sided layer can be manufactured according to the process described in FIG. 3, and the above-mentioned double-sided layer can be manufactured according to the process described in FIG. 4.

In the present invention, the adhesion properties between the two aramid multifilament layers can be enhanced by using polyethylene films with different softening points, and the ballistics performance can be improved by increasing the Slip factor while laminating the same ply.

In the third process, a ply is inserted into a mold and is pressed while being heated under pressure, and the stiffness and the flexibility of the ply is determined by the pressing temperature and pressure of the process. While pressing, a release liner for pressing is used in order to prevent the film from sticking to the press while under heat and pressure, and in order to effectively insert the film, a release liner adhered to the film is passed through more than one Tension roller, so as to enable a uniform insertion of the film, and the release liner for pressing is completely adhered to a ply while heated under pressure. In between the entire monofilament inside the ply, a polyethylene film is inserted during pressing while heated under pressure to form an adhesion between the layers.

In the present invention, it is preferable that the polyethylene film is a LDPE(Low density polyethylene) film, and the compression temperature is at 130° C. and the pressure is at 200 $kg/cm^2$, and the processing time is over 1 min.

The fourth process is related to the cooling of a ply, wherein the dimensional stability is preserved by separating a release liner from a ply after waiting for it to cool down, instead of separating them immediately.

A ballistic cloth, manufactured by the above-mentioned method composed of a unidirectionally-oriented aramid sheet and a binder layer comprised of a polyethylene film, has an excellent characteristic of above 530 m/s of ballistics performance (v50).

Hereinafter, the present invention will be described in detail through the examples. However, these examples are only for illustrative purposes, and the scope of the present invention is not limited thereto.

EXAMPLE 1

A sheet is manufactured wherein a polyethylene film is used on the surface of a unidirectionally-oriented aramid sheet in order to serve as a protection film and a binder (an aramid fiber is adhered to a polyethylene film).

COMPARATIVE EXAMPLE 1

A sheet is manufactured wherein an ultra thin PE film is used on the surface of a unidirectionally-oriented aramid sheet in order to serve as a protection film.

EXPERIMENT 1

Samples with the size of 25 mm*200 mm of each of the sheets are manufactured by the above-mentioned example 1 and comparative example 1, respectively, based on the KS M ISO 8510-2 (a peel test for two copies of the sample piece to which adhesive—flexible—rigid adhering members are adhered: 180 exfoliation), and while the part of the film is fixed to the upper grip and the part of the aramid fiber is fixed to the lower grip, a Peel (Strength) test is performed with the use of a UTM equipment. The results thereof are shown in table 1 below.

TABLE 1

| Sample History | Strength of Film Separation (kgf) |
| --- | --- |
| Example 1 | 3.3 |
| Comparative Example 1 | 0.2543 |

As described in comparative example 1, in order to take the film off, it needs to be skinned off together with the aramid yarn which is adhered to the polyethylene film. However, the strength of adhesion with the surface is at a very low level of less than 400 gf, when the Ultra Thin PE film is used as a protection film as in comparative example 1.

EXAMPLE 2

A ply is prepared by arranging a polyethylene film between the aramid multifilament layers, after the aramid multifilament layers (0/90) are cross-plied at a right angle, and by being pressed, while the compression temperature and the pressure are at 130° C. and 200 kg/cm$^2$ respectively, and the processing time is over 3 min. Thereafter, 25 overlapping layers of the ply, which is manufactured by the method as described above, are used to prepare a sample.

COMPARATIVE EXAMPLE 2

A ply is prepared by arranging a TPU (Thermoplastic polyurethane) film (0°) between the aramid multifilament layers, after the aramid multifilament layers (0/90) are cross-plied at a right angle, and by undergoing a pressing procedure, while the compression temperature and the pressure is at 130° C. and 200 kg/cm$^2$ each, and the processing time is over 3 min. Thereafter, 25 overlapping layers of the ply, which is manufactured by the method as described above, are used to prepare a sample.

EXPERIMENT 2

Figure 5:
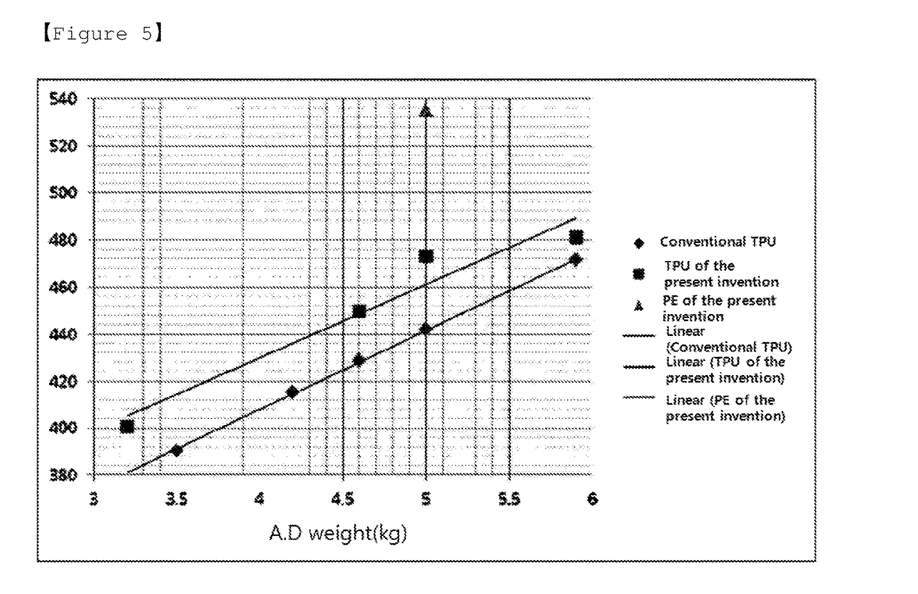
FIG. 5 is a graph which illustrates the weight(kg) of a unidirectionally-oriented aramid sheet versus v50 (m/sec), by application of example 2 and comparative example 2, in order to evaluate ballistics performance.

The ballistics performances of each of the samples, manufactured in the above-mentioned example 2 and comparative example 2 respectively, are evaluated based on NIJ-STD-010104, through V50BL test (Ballistic Limit Protection Test) with a 9 mm, 124 grain, FMJ bullet. The results thereof are shown in table 5 and FIG. 5 below.

TABLE 2

| Sample History | A.D (g/m$^2$) | Number of layers | v50 |
| --- | --- | --- | --- |
| Example 2 | 202 | 25 | 535 |
| Comparative Example 2 | 200 | 25 | 473 |

When a polyethylene film is arranged between the aramid multifilament layers, the weight is 202 g/m$^2$ and v50 is 535 m/sec, as described in comparative example 2, and when the TPU (Thermoplastic polyurethane) is arranged between the aramid multifilament layers, the weight is 200 g/m$^2$ and v50 is 473 m/sec, as described in comparative example 1.

According to the results of the performance evaluation of ballistic performance of a unidirectionally-oriented aramid sheet, it is demonstrated that using a polyethylene film brings about a performance improvement of more than 11% in comparison to using a TPU (Thermoplastic polyurethane).

EXAMPLES 3 THROUGH 7

A ply is prepared by arranging a polyethylene film between the aramid multifilament layers, after the aramid multifilament layers (0/90°) of 840 d are cross-plied at a right angle, and by undergoing a pressing procedure, while the compression temperature and the pressure are at 130° C. and 200 kg/cm$^2$ respectively, and the processing time is over 3 min. Thereafter, 25 overlapping layers of the ply, which is manufactured by the method as described above, are used to prepare a sample, of which the Total A.D (kg/m$^2$) are 3.5, 4.2, 4.6, 5 and 5.9, respectively.

COMPARATIVE EXAMPLES 3 THROUGH 7

A ply is prepared by arranging a polyethylene film between the aramid multifilament layers, after the aramid multifilament layers (0/90°) of 1500 d are cross-plied at a right angle, and by undergoing a pressing procedure, while the compression temperature and the pressure are at 130° C. and 200 kg/cm$^2$ respectively, and the processing time is over 3 min. Thereafter, 25 overlapping layers of the ply, which is manufactured by the method as described above, are used to prepare a sample, of which the Total A.D (kg/m$^2$) are 3.5, 4.2, 4.6, 5 and 5.9, respectively.

EXPERIMENT 3

Figure 6:
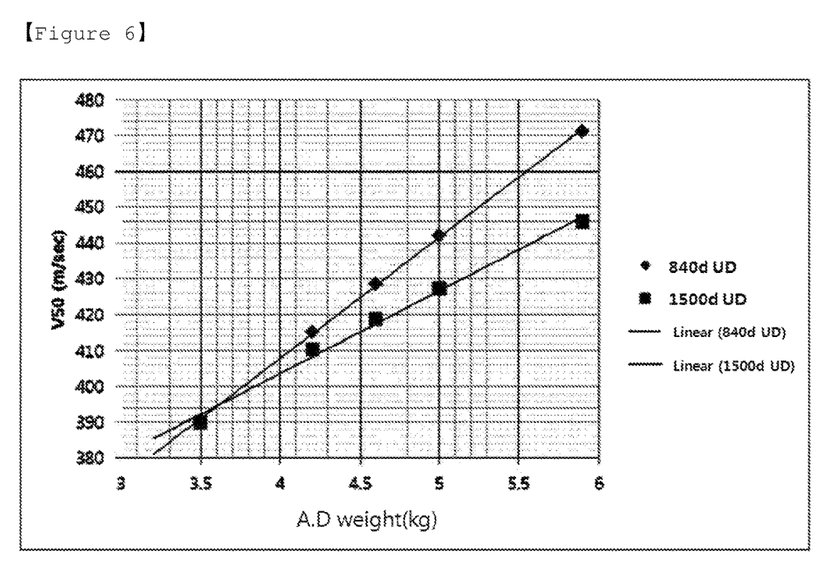
FIG. 6 is a graph which illustrates the weight (kg) of a unidirectionally-oriented aramid sheet versus v50 (m/sec), by application of examples 3 through 7 and comparative examples 3 through 7, in order to evaluate ballistics performance.

The ballistics performances of each of the samples, manufactured in the above-mentioned examples 3 through 7 and comparative examples 3 through 7 respectively, are evaluated based on NIJ-STD-010104, through V50BL test (Ballistic Limit Protection Test) with a 9 mm, 124 grain, FMJ bullet. The results thereof are shown in table 3 and FIG. 6 below.

TABLE 3

| | Total A.D (kg/m$^2$) | Number of layers | v50 (m/sec) |
| --- | --- | --- | --- |
| Example 3 | 3.5 | 25 | 390 |
| Example 4 | 4.2 | 25 | 415 |
| Example 5 | 4.6 | 25 | 429 |
| Example 6 | 5.0 | 25 | 442 |
| Example 7 | 5.9 | 25 | 471 |
| Comparative Example 3 | 3.5 | 25 | 390 |
| Comparative Example 4 | 4.2 | 25 | 410 |
| Comparative Example 5 | 4.6 | 25 | 419 |
| Comparative Example 6 | 5.0 | 25 | 427 |
| Comparative Example 7 | 5.9 | 25 | 446 |

As shown in table 3 above, when using a fiber of 840 d during the manufacturing of ballistic cloths of the same weight, as in the above-mentioned examples 3 through 7, an excellent ballistics performance in comparison to using a fiber of 1500 d is demonstrated, as in the above-mentioned examples 3 through 7.

EXAMPLE 8

A ply is prepared by manufacturing and arranging the 1st Layer and 2nd Layer at a right angle and then laminating a polyethylene film with a softening point of 125° C. to one side of the unidirectionally-oriented aramid sheet, and by arranging a polyethylene film with a softening point of 110° C. between the 1st and 2nd Layers, while the compression temperature and the pressure are at 130° C. and 200 kg/cm$^2$ respectively, and the processing time is over 3 min. Thereafter, 25 overlapping layers of the ply, which is manufactured by the method as described above, are used to prepare a sample.

COMPARATIVE EXAMPLE 8

A ply is prepared by manufacturing and arranging the 1st Layer and 2nd Layer at a right angle and then laminating a polyethylene film with a softening point of 115° C. to one side of the unidirectionally-oriented aramid sheet, and by arranging a polyethylene film with a softening point of 115° C. between the 1st and 2nd Layers, while the compression temperature and the pressure are at 130° C. and 200 kg/cm$^2$ respectively, and the processing time is over 3 min. Thereafter, 25 overlapping layers of the ply, which is manufactured by the method as described above, are used to prepare a sample.

EXPERIMENT 4

The ballistics performances of each of the samples, manufactured in the above-mentioned example 8 and comparative example 8 respectively, are evaluated based on NIJ-STD-010104, through V50BL test (Ballistic Limit Protection Test) with a 9 mm, 124 grain, FMJ bullet. The results thereof are shown in table 4 below.

TABLE 4

| | A (° C.) | B (° C.) | Total A.D (kg/m$^2$) | Number of layers | v50 (m/sec) |
|---|---|---|---|---|---|
| Example 8 | 125 | 110 | 5.05 | 25 | 535 |
| Comparative example 8 | 115 | 115 | 5.03 | 25 | 504 |

As shown in table 4 above, when a sheet is prepared by arranging a polyethylene film laminated to one side of the aramid multifilament layer, and by arranging another polyethylene film with a different softening point between the 1st and 2nd Layers, an excellent ballistics performance in comparison to using a polyethylene film with the same softening point is demonstrated, as in the above-mentioned comparative example 1.

The invention claimed is:
1. A ballistic cloth comprising:
  a 1st aramid sheet layer comprised of a plurality of unidirectionally-oriented aramid sheets, wherein each unidirectionally-oriented aramid sheet of the 1st aramid sheet layer includes a plurality of aramid monofilament layers;
  a 1st polyethylene film layer laminated to a first side of the 1st aramid sheet layer;
  a 2nd polyethylene film layer laminated to a second side of the 1st aramid sheet layer, wherein the second side of the 1st aramid sheet layer opposes the first side of the 1st aramid sheet layer;
  a 2nd aramid sheet layer comprised of a plurality of unidirectionally-oriented aramid sheets, wherein each unidirectionally oriented aramid sheet of the 2nd aramid sheet layer includes a plurality of aramid monofilament layers and a first side of the 2nd aramid sheet layer is laminated to one side of the 2nd polyethylene film layer that does not contact with the 1st aramid sheet layer, so that the 2nd aramid sheet layer is cross-plied at a right angle to the 1st aramid sheet layer; and
  a 3rd polyethylene film layer which is laminated to a second side of the 2nd aramid sheet layer, wherein the second side of the 2nd aramid sheet layer opposes the first side of the 2nd aramid sheet and that does not contact with the 2nd polyethylene film layer,
  wherein each aramid sheet layer includes greater than or equal to 7 to less than or equal to 10 aramid monofilament layers,
  wherein greater than or equal to 2 to less than or equal to 5 of each aramid sheet layer is laminated with the 1st and 3rd polyethylene film layers after pressing under heat and pressure; and
  wherein the 1st and 3rd polyethylene film layers are comprised of a low density polyethylene film.
2. The ballistic cloth using a unidirectionally-oriented aramid sheets and a polyethylene films according to claim 1, wherein the softening points of the above-mentioned 1st and 3rd polyethylene film are between 110 and 125° C., and the softening point of the 2nd polyethylene film is between 100 and 110 ° C.
3. The ballistic cloth using a unidirectionally-oriented aramid sheets and a polyethylene films according to claim 1, wherein the adhesive strengths of the 1st and 3rd polyethylene film layers are above 2 kgf.

* * * * *